United States Patent
Mintz et al.

(10) Patent No.: US 11,630,922 B2
(45) Date of Patent: Apr. 18, 2023

(54) COUNTERFEIT HARDWARE DETECTION TECHNIQUES

(71) Applicant: ROCKWELL AUTOMATION TECHNOLOGIES, INC., Mayfield Heights, OH (US)

(72) Inventors: Scott A. Mintz, Palm Beach Gardens, FL (US); James R. Copus, Fairlawn, OH (US); Dennis M. Wylie, Jr., Mentor, OH (US); Brian J. Widman, South Euclid, OH (US); Asanka K. Mananayaka, Twinsburg, OH (US); Dan A. Gagich, Painesville, OH (US); Nathan B. Smith, Hudson, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 17/483,373

(22) Filed: Sep. 23, 2021

(65) Prior Publication Data

US 2023/0088422 A1 Mar. 23, 2023

(51) Int. Cl.
*G06F 21/73* (2013.01)
*G06F 21/33* (2013.01)
(Continued)

(52) U.S. Cl.
CPC ............. *G06F 21/73* (2013.01); *G06F 21/72* (2013.01)

(58) Field of Classification Search
CPC .......... G06F 21/44; G06F 21/73; G06F 21/33; G06F 21/57; H04L 63/0823; H04L 63/0876; H04L 9/3263
See application file for complete search history.

(56) References Cited

U.S. PATENT DOCUMENTS

| | | |
|---|---|---|
| 2013/0067236 A1 | 3/2013 | Russo et al. |
| 2013/0125204 A1* | 5/2013 | La Fever ............ H04L 63/0876 726/2 |

(Continued)

FOREIGN PATENT DOCUMENTS

| | | | |
|---|---|---|---|
| WO | 2021034317 A1 | 2/2021 | |
| WO | WO-2021034317 A1 * | 2/2021 | ............. G06F 21/44 |

(Continued)

OTHER PUBLICATIONS

Extended European Search Report for Application No. 22196922.3 dated Feb. 23, 2023, 7 pages.

*Primary Examiner* — Lizbeth Torres-Diaz
(74) *Attorney, Agent, or Firm* — Fletcher Yoder, P.C.

(57) ABSTRACT

A method may include retrieving, by one or more processors of an industrial automation component, one or more parameters from a configuration file stored in a memory of the industrial automation component and one or more additional parameters from a vendor certificate stored in the memory. The vendor certificate is cryptographically signed by an entity. The method may also include determining, by the processors, whether the parameters from the configuration file match the additional parameters from the vendor certificate, and in response to determining that the parameters from the configuration file do not match the additional parameters from the vendor certificate, transmitting, by the processors, an indication that the industrial automation component is an unauthorized component to a display device for display, disabling the industrial automation component, or both.

20 Claims, 3 Drawing Sheets

Figure 1:
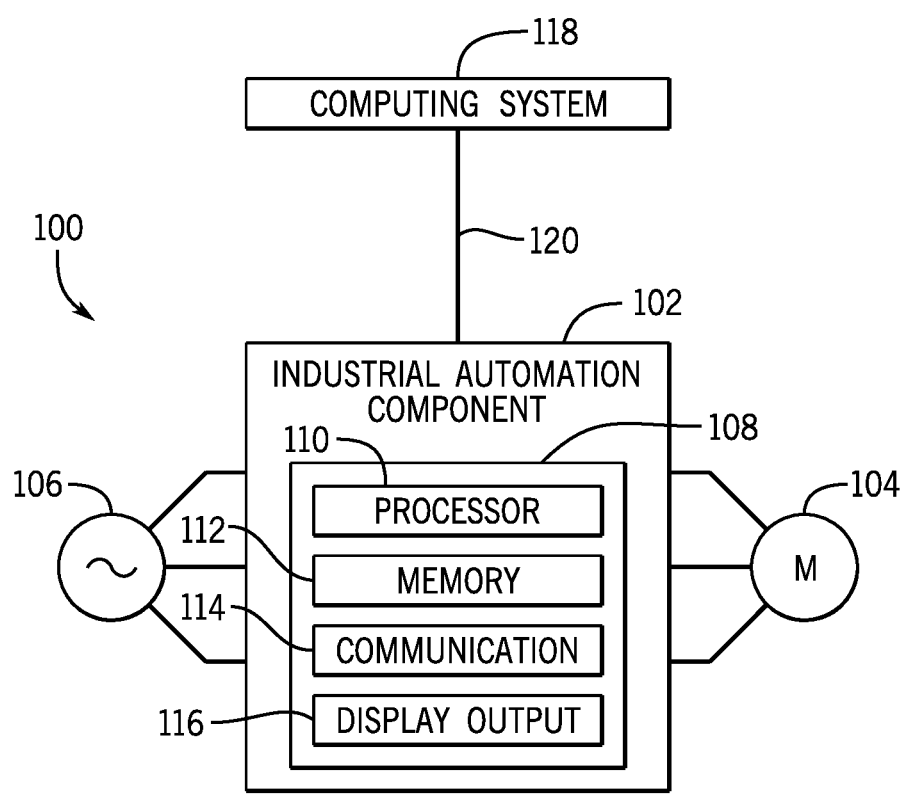

(51) Int. Cl.
    *G06F 21/44*     (2013.01)
    *G06F 21/57*     (2013.01)
    *G06F 21/72*     (2013.01)

(56) References Cited

U.S. PATENT DOCUMENTS

2017/0093582 A1    3/2017   Keidar
2020/0233956 A1*  7/2020   Wang .................... G06F 21/554
2021/0349836 A1* 11/2021   Benedict ............. G06F 12/1466

FOREIGN PATENT DOCUMENTS

WO     WO-2021205460 A1 * 10/2021
WO     WO-2022089290 A1 *  5/2022

\* cited by examiner

COUNTERFEIT HARDWARE DETECTION TECHNIQUES

BACKGROUND

The invention relates generally to detecting counterfeit hardware. More specifically, the present disclosure is related to detecting counterfeit hardware, reporting such counterfeit hardware to a user, and/or limiting the use of such counterfeit hardware.

Industrial automation systems may be used to provide automated control of one or more actuators. A control may output a conditioned power signal to an actuator to control movement of the actuator. In an effort to reduce costs, owners of the industrial automation systems may procure components for use in the industrial automation systems from unauthorized sources. These components may include counterfeit components, stolen components, clones, refurbished components made from one or more decommissioned or previously used components, or components that have been modified, either maliciously (e.g., malware) or in an effort to modify the components' capabilities, such that use of the components may pose unknown risks to the industrial automation systems. Accordingly, a process for detecting and limiting use of such components is needed.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, an industrial automation component may include one or more processors and a memory accessible by the one or more processors. The memory may include a configuration file that includes one or more parameters associated with the industrial automation component. The industrial automation component may communicate with one or more additional industrial automation components based on the parameters. The memory may also include a vendor certificate comprising one or more additional parameters associated with the industrial automation component. The vendor certificate is cryptographically signed by an entity. The memory may further include instructions, that when executed by the processors, cause the processors to perform operations. The operations may include retrieving the parameters from the configuration file and the additional parameters from the vendor certificate, determining whether the parameters from the configuration file match the additional parameters from the vendor certificate, and in response to determining that the parameters from the configuration file do not match the additional parameters from the vendor certificate, transmitting an indication that the industrial automation component is an unauthorized component to a display device for display, disabling the industrial automation component, or both.

In another embodiment, a method may include retrieving, by one or more processors of an industrial automation component, one or more parameters from a configuration file stored in a memory of the industrial automation component and one or more additional parameters from a vendor certificate stored in the memory. The vendor certificate is cryptographically signed by an entity. The method may also include determining, by the processors, whether the parameters from the configuration file match the additional parameters from the vendor certificate, and in response to determining that the parameters from the configuration file do not match the additional parameters from the vendor certificate, transmitting, by the processors, an indication that the industrial automation component is an unauthorized component to a display device for display, disabling the industrial automation component, or both.

In yet another embodiment, a non-transitory, computer-readable medium of an industrial automation component includes instructions that, when executed by one or more processors of the industrial automation component, cause the processors to perform operations. The operations may include retrieving one or more parameters from a configuration file stored in a memory accessible by the processors and one or more additional parameters from a vendor certificate stored in the memory. The vendor certificate is cryptographically signed by an entity. The operations may also include determining whether the parameters from the configuration file match the additional parameters from the vendor certificate, and in response to determining that the parameters from the configuration file do not match the additional parameters from the vendor certificate, transmitting an indication that the industrial automation component is an unauthorized component to a display device for display, disabling the industrial automation component, or both.

DRAWINGS

Figure 2:
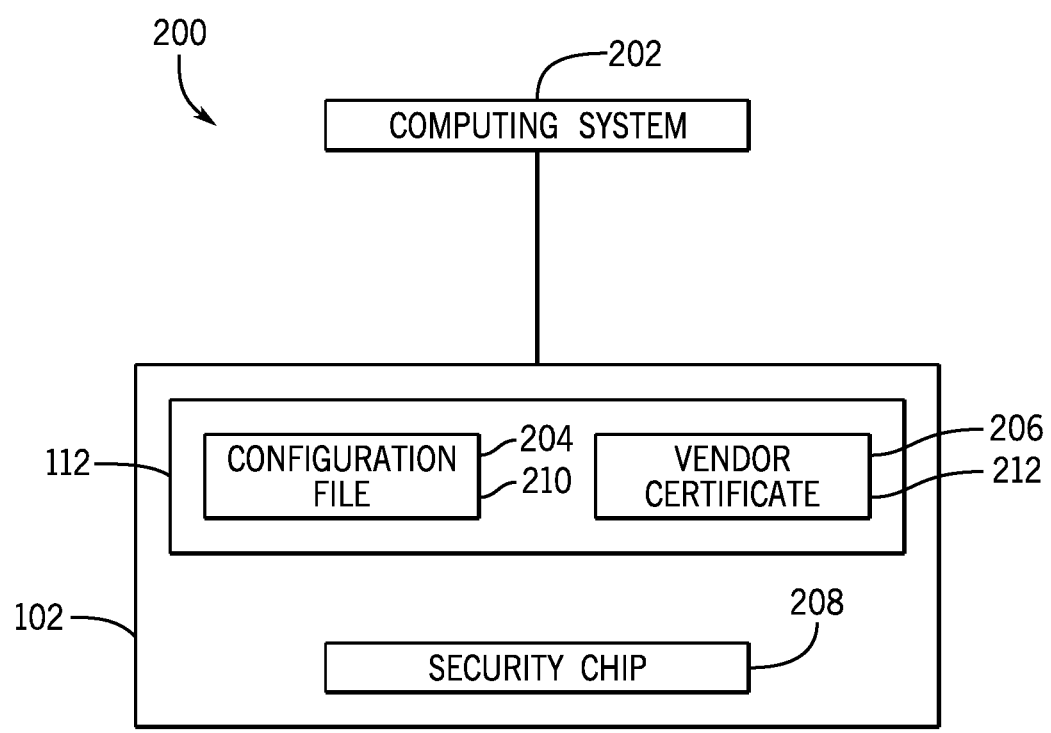
Figure 3:
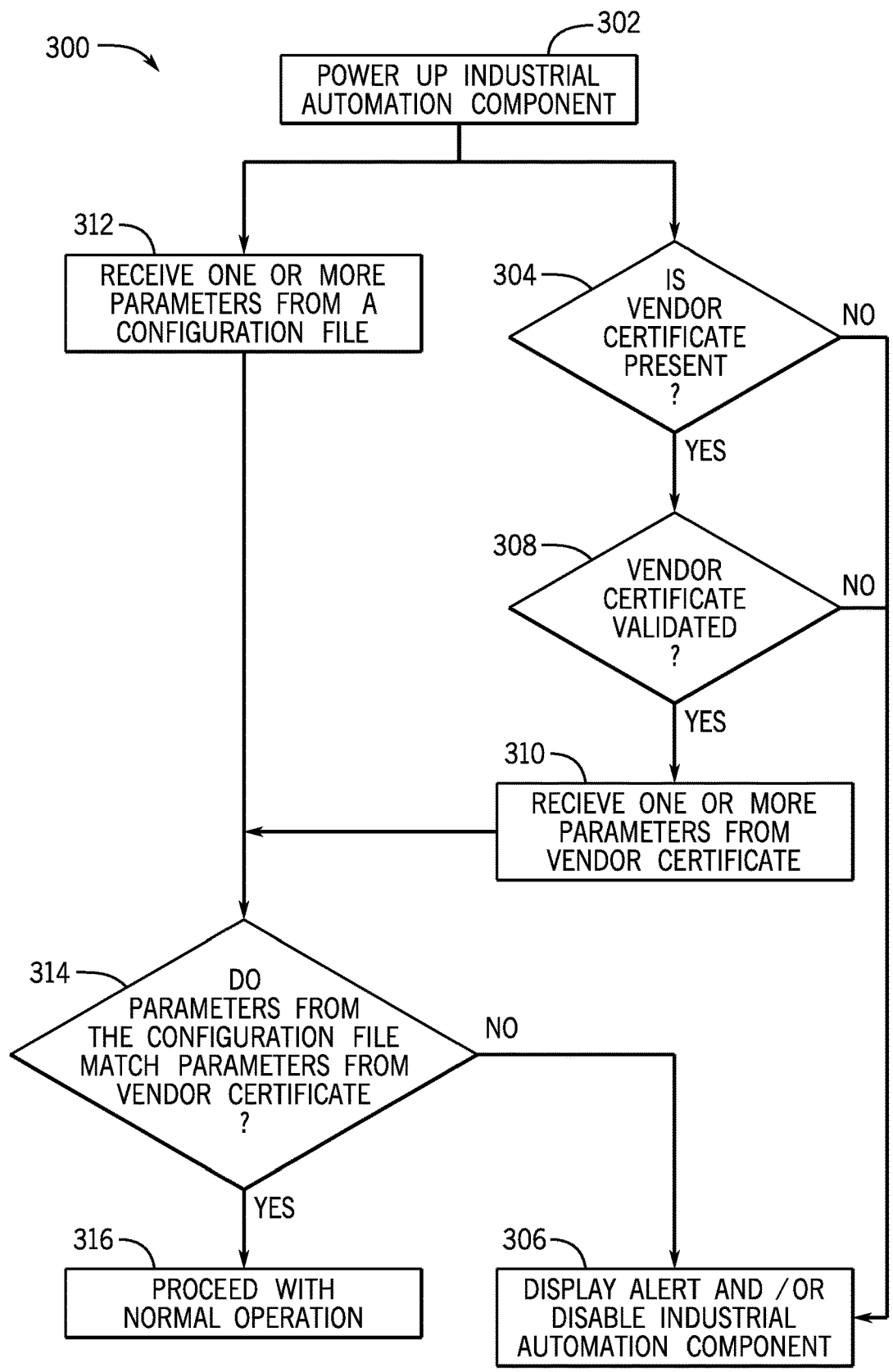

These and other features, aspects, and advantages of the present invention will become better understood when the following detailed description is read with reference to the accompanying drawings in which like characters represent like parts throughout the drawings, wherein:

FIG. 1 is a block diagram of an industrial automation component in an industrial automation system, in accordance with an embodiment;

FIG. 2 is a block diagram of the industrial automation component of FIG. 1 before the industrial automation component has been distributed from a manufacturer, in accordance with an embodiment; and FIG. 3 is a flowchart for detecting whether the industrial automation component of FIGS. 1 and 2 is a counterfeit or otherwise unauthorized industrial automation component, in accordance with an embodiment.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As mentioned above, owners of industrial automation systems may procure components for use in the industrial automation systems from unauthorized sources. These components may include counterfeit components, stolen components, clones, refurbished components made from one or more decommissioned or previously used components, components that have been modified, either maliciously (e.g., malware) or in an effort to modify the components' capabilities, or the like, such that use of the components may pose unknown risks to the industrial automation systems. As used herein, such components may collectively be referred to as "unauthorized components."

Accordingly, embodiments of the present disclosure are directed to detecting whether industrial automation components are unauthorized components. In particular, after an industrial automation component has been powered on and/or has been installed in an industrial automation system, the industrial automation component will determine whether the industrial automation component is an unauthorized component before performing another operation. For example, the industrial automation component may compare one or more parameters in a vendor certificate associated with the industrial automation component to one or more corresponding parameters in a configuration file (e.g., a system manifest) associated with the industrial automation component to determine whether the industrial automation component is an unauthorized component. In particular, the vendor certificate may be cryptographically signed by the manufacturer of the industrial automation component such that the identification parameters in the vendor certificate may not be altered by a third-party.

If the industrial automation component determines that the identification parameters match, the industrial automation component may proceed to perform another operation. Alternatively, if the industrial automation component determines that the identification parameters do not match, the industrial automation component may display an indication of the determination that the industrial automation component is an unauthorized component to a user (e.g., the owner) and/or execute a routine that disables the industrial automation component from further operation. In some embodiments, the routine may continuously cause the industrial automation component to only display a notification that the industrial automation component is an unauthorized component. In this way, the industrial automation component may be locked from any other use, thereby preventing further use of the industrial automation component. Accordingly, any risks that would otherwise be present if the industrial automation component was allowed to operate would be prevented.

In other embodiments, the industrial automation component may display an indication (e.g., a notification) of the determination that the industrial automation component is an unauthorized component to the user. However, the industrial automation component may still permit operation. In this way, the user may be notified that the industrial automation component is an unauthorized component while still being able to use the industrial automation component.

By way of introduction, FIG. 1 is a block diagram of an industrial automation system 100. As shown, the industrial automation system 100 includes an industrial automation component 102. In certain embodiments, the industrial automation component 102 may be a controller, a communication module, an input/output (I/O) module, a motor control center, a motor, a human machine interface (HMI), a user interface, a contactor, a starter, a sensor, a drive, a relay, a protection device, a switchgear, a compressor, a network switch, or the like. The industrial automation component 102 may be coupled to an actuator 104 (e.g., a motor) and a power source 106. The power source 106 may include a generator, a battery (or other power storage device), or an external power grid.

The industrial automation component 102 may also include processing circuitry 108, such as a processor 110, a memory 112, a communication component 114, a display output 116, and the like. The communication component 114 may be a wireless or a wired communication component that may facilitate communication between the industrial automation component 102, one or more other industrial automation components in the industrial automation system 100, a computing system 118, and the like via a network 120. For example, the industrial automation component 102 may communicate via a wired or wireless communication protocol, such as Wi-Fi, mobile telecommunications technology (e.g., 2G, 3G, 4G, 5G), Bluetooth®, near-field communication technology, or any other suitable communication protocol. Additionally, or alternatively, the communication component 114 may include a network interface to enable communication via various protocols such as EtherNet/IP®, ControlNet®, DeviceNet®, or any other industrial communication network protocol.

The processor 110 may be any suitable type of computer processor or microprocessor capable of executing computer-executable code, including but not limited to one or more field programmable gate arrays (FPGAs), application-specific integrated circuits (ASICs), programmable logic devices (PLDs), programmable logic arrays (PLAs), and the like. The processor 110 may, in some embodiments, include multiple processors. Additionally, the memory 112 may include any suitable articles of manufacture that serve as media to store processor-executable code, data, and the like. For example, the memory 112 may store non-transitory processor-executable code used by the processor 110 to perform the presently disclosed techniques. The memory 112 may also store a vendor certificate associated with the industrial automation component 102 and a configuration file (e.g., a system manifest) associated with the industrial automation component 102. In some embodiments, the memory 112 may include NAND flash memory, NOR flash memory, or the like. For example, the vendor certificate may be stored in a first type of memory device (e.g., a NAND flash memory), and the configuration file may be stored in a second type of memory device (e.g., a SPINOR flash memory).

The display output 116 may be any suitable image-transmitting component, such as a display (e.g., an image display, a video display, an LED display, or the like). As mentioned above, the display output 116 may display an indication of a determination that the industrial automation component 102 is an unauthorized component to a user. In certain embodiments, the processor 110 and/or the display output 116 may transmit a representation of the indication to the computing system 118 via the network 120. For instance, a display device of the computing system 118 may display the indication of the determination that the industrial automation component 102 is an unauthorized component.

As mentioned above, a manufacturer of the industrial automation component 102 may cryptographically sign and issue a vendor certificate to the industrial automation component 102 before the industrial automation component 102 is distributed to a consumer. For instance, the industrial automation component 102 may store a representation of the vendor certificate in the memory 112 of the industrial automation component 102 during a manufacturing or configuration process associated with the industrial automation component 102. Additionally, the manufacturer of the industrial automation component 102 may store a representation of a configuration file (e.g., a system manifest) associated with the industrial automation component 102 in the memory 112 of the industrial automation component 102. For example, after distribution of the industrial automation component 102, the industrial automation component 102 may use one or more parameters in the configuration file to communicate with other industrial automation components in the industrial system 100.

With the foregoing in mind, FIG. 2 is a block diagram of the industrial automation component 102 during a manufacturing or configuration process of the industrial automation component 102 before the industrial automation component 102 has been distributed to a consumer. During the manufacturing or configuration process, a computing system 202 of a manufacturer may generate a configuration file 204 (e.g., a system manifest) with one or more parameters and store the configuration file 204 in the memory 112 of the industrial automation component 102. As mentioned above, after distribution of the industrial automation component 102 (e.g., after installation of the industrial automation component 102 in the industrial system 100), the industrial automation component 102 may use the parameters in the configuration file to communicate with other industrial automation components within the industrial system 100. For example, the industrial automation component 102 may identify itself as a particular type of device to other industrial automation components 102. In certain embodiments, the parameters in the configuration file 204 may include a serial number, a media access control (MAC) identifier, a vendor identifier, a product type, a product code, a catalog string, a hardware revision identifier, or the like, or a combination thereof. However, it should be understood that the preceding list of parameters in the configuration file 204 is exemplary. In other embodiments, the parameters may include any other suitable parameter for use by the industrial automation component 102 to communicate with other industrial automation components within the industrial automation system 100.

Additionally, during the manufacturing or configuration process, the computing system 202 of the manufacturer may also cryptographically sign and issue a vendor certificate 206 to the industrial automation component 102. For instance, the computing system 202 may include a public key infrastructure (PKI) that creates and manages digital certificates to various types of industrial automation components. For example, the PKI may issue digital certificates based on the X.509 standard or any other suitable format. As illustrated in FIG. 2, the PKI may sign the vendor certificate 206 using a private key associated with the manufacturer. The vendor certificate 206 may include a unique public key associated with a private key stored in a hardware security chip 208 of the industrial automation component 102. Accordingly, the signing the vendor certificate 206 by the PKI using the private key authenticates the vendor certificate 206 and the private key of the industrial automation component 102.

The computing system 202 may then transmit the vendor certificate 206 to the industrial automation component 102 for storage in the memory 112. By cryptographically signing the vendor certificate 206, the manufacturer may prevent tampering or otherwise altering the information stored in the vendor certificate 106. In certain embodiments, the vendor certificate 206 may include one or more parameters, such as a serial number, a vendor identifier, a product type, a product code, a catalog string, a hardware revision identifier, or the like, or a combination thereof. However, it should be understood that the preceding list of parameters in the vendor certificate 206 is exemplary. In other embodiments, the parameters may include any other suitable parameter to identify the industrial automation component 102 via the vendor certificate 206.

As mentioned above, the configuration file 204 may be stored in a different type of memory device than the vendor certificate 206. For instance, the memory 112 may include more than one type of memory device. As illustrated in FIG. 2, the configuration file 204 may be stored in a first type of memory device 210 (e.g., a NAND flash memory), and the vendor certificate may be stored in a second type of memory device 212 (e.g., a SPINOR flash memory).

After the industrial automation component 102 has been distributed from the manufacturer and powered on and/or has been installed in the industrial automation system 100, the industrial automation component 102 may determine whether the industrial automation component 102 is an unauthorized component based on the configuration file 204 and the vendor certificate 206. For example, upon boot up of the industrial automation component 102, the industrial automation component 102 may compare one or more parameters in the vendor certificate 206 to one or more corresponding parameters in the configuration file 204 to determine whether the parameters match. In response to determining that the parameters do not match, the industrial automation component 102 may determine that the industrial automation component 102 is an unauthorized component and alert a user (e.g., the owner) of the determination and/or disable the industrial automation component 102 from any additional use. Alternatively, in response to determining that the parameters do match, the industrial automation component 102 may be permitted to perform an additional operation associated with the industrial automation system 100. In this way, the industrial automation component 102 may automatically self-determine whether the industrial automation component 102 has been tampered with or altered such that the industrial automation component 102 has become an unauthorized component.

With the foregoing in mind, FIG. 3 is a flowchart of a process 300 for detecting whether the industrial automation component 102 is an unauthorized component. It should be noted that although the process will be described as being performed by the processor 110 and the security chip 208 of the industrial automation component 102, it should be understood that the process 300 may be performed by any suitable sub-component associated with the industrial automation component 102. In addition, although the process 300 is described in a particular order, it should be noted that the process 300 may be performed in any suitable order.

At block 302, the industrial automation component 102 may power on. For example, the industrial automation component 102 may be installed in an industrial automation system 100 by an owner of the industrial automation component 102. After the industrial automation component 102 has powered on, the processor 110 of the industrial automation component 102 may determine whether the industrial automation component 102 is an unauthorized component (e.g., during boot up of the industrial automation component 102). For instance, the processor 110 may immediately perform the steps at blocks 304-314 after the industrial automation component 102 has powered on and before the industrial automation component 102 is permitted to perform another operation (e.g., an operation associated with the industrial automation system 100). However, it should be understood that in other embodiments, the processor 110 may perform the steps at blocks 304-314 at any other suitable time after the industrial automation component 102 has powered on.

At block 304, the processor 110 may verify that the vendor certificate 206 is present in the memory 112 of the industrial automation component 102. For example, if the processor 110 determines that the vendor certificate 206 is missing from the memory 112 of the industrial automation component 102, the determination may be indicative of possible tampering of the industrial automation component 102 by a third-party to remove the vendor certificate. Accordingly, the processor 110 may display an indication to a user that the industrial automation component 102 is an unauthorized component and/or disable the industrial automation component 102 at block 306. For example, the indication may include a notification, a message, a graphic, or the like, or a combination thereof. In some embodiments, the indication may also include a reason explaining why the industrial automation component 102 has been determined to be an unauthorized component. For example, the indication may display a notification that the industrial automation component 102 is missing a vendor certificate, a recommendation to contact customer service because the industrial automation component 102 is not under warranty, or the like. The processor 110 may display the indication via a user interface associated with the industrial automation component 102.

In certain embodiments, the industrial automation component 102 may include a display device that displays the indication. In other embodiments, the industrial automation component 102 may transmit a representation of the indication to the computing system 118 in the industrial automation system 110. For example, the computing system 118 may trigger an alarm or display a notification based on the received representation of the indication. Additionally, or alternatively, the processor 102 may disable the industrial automation component 102 from further use. In certain embodiments, the processor 110 may execute a routine that continuously causes the industrial automation component 102 to display the indication that the industrial automation component 102 is an unauthorized component. In particular, the routine (e.g., a while loop) may not allow the industrial automation component 102 to perform any other operation besides displaying the indication. For example, the user may not be able to restore normal operation of the industrial automation component 102 after the industrial automation component 102 has executed the routine.

Although the processor 110 is described herein as displaying the indication that the industrial automation component 102 is an unauthorized component and/or disabling the industrial automation component 102 from further use at block 306, it should be understood that the processor 110 may perform certain actions in addition to, or instead of, displaying the indication and/or disabling the industrial automation component 102. For example, the processor 110 may log the determination that the industrial automation component 102 is an unauthorized component. In particular, the processor 110 may store a log entry in the memory 112 that includes various types of information associated with the determination that the industrial automation component 102 is an unauthorized component. In certain embodiments, the information may include the reason that the processor 110 determined that the industrial automation component 102 is an unauthorized component, the date of the determination, the time of the determination, other actions that the industrial automation component 102 performed in response to the determination (e.g., disabling the industrial automation component 102, displaying an indication of the determination, or the like), or a combination thereof. Thereafter, the processor 110 may transmit the log entry to a computing system (e.g., the computing system 202) associated with the manufacturer after the industrial automation component 102 is communicatively coupled to the computing system. For instance, an owner may ship the industrial automation component 102 to the manufacturer for diagnosis. The computing system of the manufacturer may then receive the log entry from the memory 112 of the industrial automation component 102 for further analysis.

If the processor 110 determines that the vendor certificate 206 is present in the memory 112 of the industrial automation component 102 at block 304, the processor 110 may then validate the vendor certificate 206 at block 308. For example, the processor 110 may transmit a command to the security chip 208 to validate the vendor certificate 206. In certain embodiments, the security chip 208 may validate the vendor certificate 206 by verifying the integrity of the vendor certificate 206, verifying the validity of the vendor certificate 206, determining a revocation status associated with the vendor certificate 206, verifying an issuer of the vendor certificate 206, or the like, or a combination thereof. For instance, the security chip 208 may verify the integrity of the vendor certificate 206 or the issuer of the vendor certificate 206 by performing one or more cryptographic operations to determine whether the cryptographic signature associated with the vendor certificate 206 or an issuer field of the vendor certificate 206 has been modified after the vendor certificate 206 was issued to the industrial automation component 102 by the manufacturer. If the security chip 208 determines that the cryptographic signature associated with the vendor certificate 206 or the issuer field associated with the vendor certificate 206 has been modified, the security chip 208 may transmit an indication of a determination that the vendor certificate 206 is not valid to the processor 110.

Additionally, the security chip 208 may verify the integrity of the vendor certificate 206 by determining whether the current date and/or time is within a validity period associated with the vendor certificate 206. For example, the security chip 208 may decrypt the vendor certificate 206 to determine the validity period defined by the vendor certificate 206. If the security chip 208 determines that the current date and/or time is not within the validity period associated with the vendor certificate 206, the security chip 208 may transmit an indication of a determination that the vendor certificate is not valid to the processor 110.

Further, the security chip 208 may determine a revocation status associated with the vendor certificate 206 by determining whether the manufacturer has issued a revocation of the vendor certificate 206. For example, the security chip 208 may transmit a request for a revocation status of the vendor certificate 206 to the PKI of the computing system 202 via the network 120. The PKI may then transmit an indication to the security chip 208 that indicates whether the vendor certificate 206 has been revoked by the manufacturer or not. For instance, the manufacturer may revoke the vendor certificate 206 based on a suspected compromise of the private key associated with the industrial automation component 102 or the like. In any case, if the security chip 208 determines that the vendor certificate 206 has been revoked based on the indication received from the PKI, the security chip 208 may transmit an indication of a determination that the vendor certificate is not valid to the processor 110.

If the security chip 208 transmits the indication of the determination that the vendor certificate 206 is not valid to the processor 110, the processor 110 may then display an indication to the user that the industrial automation component 102 is an unauthorized component and/or disable the industrial automation component 102 at block 306 described above. For example, the indication may display a notification that the cryptographic signature associated with the vendor certificate 206 or the issuer field associated with the vendor certificate 206 has been impermissibly modified, the validity period associated with the vendor certificate 206 has expired, the vendor certificate 206 has been revoked, a recommendation to contact customer service because the industrial automation component 102 is not under warranty, or the like.

Alternatively, if the security chip 208 determines that the vendor certificate 206 is valid at block 308, the security chip 208 may transmit an indication of the determination that the vendor certificate 206 is valid to the processor 110. At block 310, the processor 110 may then receive one or more parameters within the vendor certificate 206. For example, the processor 110 may transmit a request to the security chip 208 for one or more parameters in the vendor certificate 206 to compare to one or more corresponding parameters in the configuration file 204 associated with the industrial automation component 102. After receiving the request from the processor 110, the security chip 208 may perform one or more cryptographic operations to decrypt the vendor certificate and transmit the decrypted information associated with the parameters to the processor 110.

In certain embodiments, the security chip 208 may have already decrypted the vendor certificate 206 at block 308. In such embodiments, the security chip 208 may transmit the decrypted information associated with the parameters to the processor 110 in response to receiving the request from the processor 110 or transmit the decrypted information associated with the parameters to the processor 110 along with the indication that the vendor certificate 206 is valid. In any case, the decrypted information associated with the parameters within the vendor certificate 206 may include a serial number, a vendor identifier, a product type, a product code, a catalog string, a hardware revision identifier, or the like, or a combination thereof.

At block 312, the processor 110 may also receive one or more parameters within the configuration file 204. Since the configuration file 312 is not cryptographically signed or otherwise encrypted, the processor 110 may receive the parameters within the configuration file 204 directly from the memory 112. As mentioned above, the information associated with the parameters within the configuration file 204 may include a serial number, a media access control (MAC) identifier, a vendor identifier, a product type, a product code, a catalog string, a hardware revision identifier, or the like, or a combination thereof. Although the step of block 312 is described herein as being performed by the processor 110 after the step of block 310, it should be understood that the processor 110 may perform the step of block 312 at any suitable time. For instance, the processor 110 may receive the parameters within the configuration file 204 before, in parallel, or after one or more of the steps of blocks 304, 308, and 310.

At block 314, the processor 110 may determine whether one or more of the parameters received from the configuration file 204 match one or more of the parameters received from the vendor certificate 206. For example, the processor 110 may determine that the industrial automation component 102 is an unauthorized component if at least one of the configuration file parameters do not match the corresponding vendor certificate parameters, at least one of vendor certificate parameters is missing from the configuration file parameters, or the like. If the processor 110 determines that the industrial automation component 102 is an unauthorized component at block 314, the processor 110 may then display an indication to the user that the industrial automation component 102 is an unauthorized component and/or disable the industrial automation component 102 at block 306 described above. For example, the indication may display a notification that one or more parameters of the configuration file 204 do not match one or more parameters of the vendor certificate 206 (e.g., do not overlap), the industrial automation component 102 has been impermissibly tampered with, a recommendation to contact customer service because the industrial automation component 102 is not under warranty, or the like.

Alternatively, if the processor 110 determines that the industrial automation component 102 is not an unauthorized component at block 314, the industrial automation component 102 may be allowed to proceed with another operation (e.g., a normal operation) associated with the industrial automation component 102, the industrial automation system 100, or the like.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An industrial automation component, comprising:
one or more processors; and
a memory, accessible by the one or more processors, the memory storing:
a configuration file comprising one or more parameters associated with the industrial automation component, wherein the industrial automation component is configured to communicate with one or more additional industrial automation components based on the one or more parameters;
a vendor certificate comprising one or more additional parameters associated with the industrial automation component, wherein the vendor certificate is cryptographically signed by an entity; and
instructions, that when executed by the one or more processors, cause the one or more processors to perform operations comprising:
retrieving the one or more parameters from the configuration file and the one or more additional parameters from the vendor certificate;
determining whether the one or more parameters from the configuration file match the one or more additional parameters from the vendor certificate; and
in response to determining that the one or more parameters from the configuration file do not match the one or more additional parameters from the vendor certificate, transmitting an indication that the industrial automation component is an unauthorized component to a display device for display, disabling the industrial automation component, or both.

2. The industrial automation component of claim 1, wherein transmitting the indication that the industrial automation component is an unauthorized component, disabling the industrial automation component, or both, comprises executing a routine that prevents the industrial automation component from performing a different operation.

3. The industrial automation component of claim 1, wherein the processor is configured to perform the operations during a boot up process of the industrial automation component.

4. The industrial automation component of claim 1, wherein the operations comprise determining whether the vendor certificate is present in the memory before receiving the one or more additional parameters from the vendor certificate.

5. The industrial automation component of claim 4, wherein the operations comprise determining whether the vendor certificate is valid in response to determining that the vendor certificate is present in the memory before receiving the one or more additional parameters from the vendor certificate.

6. The industrial automation component of claim 5, comprising a security chip, wherein the operations comprise transmitting a command to the security chip to validate the vendor certificate.

7. The industrial automation component of claim 5, wherein the operations comprise transmitting the indication that the industrial automation component is an unauthorized component to the display device for display, disabling the industrial automation component, or both, in response to determining that the vendor certificate is not valid.

8. The industrial automation component of claim 4, wherein the operations comprise transmitting the indication that the industrial automation component is an unauthorized component to the display device for display, disabling the industrial automation component, or both, in response to determining that the vendor certificate is not present in the memory.

9. A method, comprising:
retrieving, by one or more processors of an industrial automation component, one or more parameters from a configuration file stored in a memory of the industrial automation component and one or more additional parameters from a vendor certificate stored in the memory, wherein the vendor certificate is cryptographically signed by an entity;
determining, by the one or more processors, whether the one or more parameters from the configuration file match the one or more additional parameters from the vendor certificate; and
in response to determining that the one or more parameters from the configuration file do not match the one or more additional parameters from the vendor certificate, transmitting, by the one or more processors, an indication that the industrial automation component is an unauthorized component to a display device for display, disabling the industrial automation component, or both.

10. The method of claim 9, wherein transmitting the indication that the industrial automation component is an unauthorized component, disabling the industrial automation component, or both, comprises executing a routine that prevents the industrial automation component from performing a different operation.

11. The method of claim 9, wherein the routine comprises code indicative of a while loop, that when executed by the one or more processors, causes the one or more processors to continuously transmit the indication to the display device for display.

12. The method of claim 9, wherein determining that the one or more parameters from the configuration file do not match the one or more additional parameters from the vendor certificate comprise determining that the one or more parameters from the configuration file do not overlap with the one or more additional parameters from the vendor certificate.

13. The method of claim 9, wherein the one or more parameters from the configuration file comprise a serial number, a media access control (MAC) identifier, a vendor identifier, a product type, a product code, a catalog string, a hardware revision identifier, or a combination thereof.

14. The method of claim 9, wherein the one or more additional parameters from the vendor certificate comprise a serial number, a vendor identifier, a product type, a product code, a catalog string, a hardware revision identifier, or a combination thereof.

15. A non-transitory, computer-readable medium of an industrial automation component, comprising instructions that, when executed by one or more processors of the industrial automation component, cause the one or more processors to perform operations comprising:
retrieving one or more parameters from a configuration file stored in a memory accessible by the one or more processors and one or more additional parameters from a vendor certificate stored in the memory, wherein the vendor certificate is cryptographically signed by an entity;

determining whether the one or more parameters from the configuration file match the one or more additional parameters from the vendor certificate; and in response to determining that the one or more parameters from the configuration file do not match the one or more additional parameters from the vendor certificate, transmitting an indication that the industrial automation component is an unauthorized component to a display device for display, disabling the industrial automation component, or both.

16. The non-transitory, computer-readable medium of claim 15, wherein transmitting the indication that the industrial automation component is an unauthorized component, disabling the industrial automation component, or both, comprises executing a routine that prevents the industrial automation component from performing a different operation.

17. The non-transitory, computer-readable medium of claim 15, wherein the memory comprises a first type of memory and a second type of memory, and wherein the first type of memory comprises the configuration file and the second type of memory comprises the vendor certificate.

18. The non-transitory, computer-readable medium of claim 17, wherein the first type of memory comprises a SPINOR flash memory.

19. The non-transitory, computer-readable medium of claim 17, wherein the second type of memory comprises a NAND flash memory.

20. The non-transitory, computer-readable medium of claim 15, wherein the operations comprises storing a log entry indicative of the industrial automation component being an unauthorized component in the memory.

* * * * *